(12) United States Patent
Wetsch

(10) Patent No.: US 11,858,712 B2
(45) Date of Patent: *Jan. 2, 2024

(54) FLEXIBLE STRUCTURE WITH PERFORATION-FREE INFLATION CHANNEL

(71) Applicant: PREGIS INNOVATIVE PACKAGING LLC, Deerfield, IL (US)

(72) Inventor: Thomas D. Wetsch, St. Charles, IL (US)

(73) Assignee: Pregis Innovative Packaging LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/686,751

(22) Filed: Apr. 14, 2015

(65) Prior Publication Data

US 2015/0291336 A1    Oct. 15, 2015

Related U.S. Application Data

(60) Provisional application No. 61/979,494, filed on Apr. 14, 2014.

(51) Int. Cl.

| | |
|---|---|
| *B65D 81/05* | (2006.01) |
| *B32B 27/08* | (2006.01) |
| *B32B 7/06* | (2019.01) |
| *B32B 27/34* | (2006.01) |
| *B32B 27/30* | (2006.01) |
| *B32B 27/32* | (2006.01) |

(Continued)

(52) U.S. Cl.
CPC ............. *B65D 81/052* (2013.01); *B32B 3/30* (2013.01); *B32B 7/05* (2019.01); *B32B 7/06* (2013.01); *B32B 27/08* (2013.01); *B32B 27/306* (2013.01); *B32B 27/32* (2013.01); *B32B 27/34* (2013.01); *B32B 2307/31* (2013.01); *B32B 2307/582* (2013.01); *B32B 2307/7242* (2013.01); *B32B 2553/026* (2013.01); *B32B 2571/00* (2013.01)

(58) Field of Classification Search
CPC ................................ B65D 81/052; B32B 3/30
See application file for complete search history.

(56) References Cited

U.S. PATENT DOCUMENTS

| | | |
|---|---|---|
| 4,482,056 A | 11/1984 | Dutcher |
| 4,963,428 A | 10/1990 | Harvey et al. |
| 4,982,845 A | 1/1991 | Prascak et al. |

(Continued)

FOREIGN PATENT DOCUMENTS

WO    2013088372 A1    6/2013

OTHER PUBLICATIONS

United States Patent and Trademark Office, International Search Report and The Written Opinion of the International Searching Authority for International Application No. PCT/US15/25834, dated Jul. 15, 2015, 9 pages.

*Primary Examiner* — Derek J Battisti
(74) *Attorney, Agent, or Firm* — Fox Rothschild LLP

(57) ABSTRACT

The present disclosure relates to inflatable flexible structures. An inflation region may run longitudinally through the inflatable flexible structure allowing the inflation of chambers. The inflatable chambers may be separable at transverse lines of weakness formed by perforations. The inflation conduit may be free of the perforation. Additionally or alternatively, the perforations may be chevron shaped.

23 Claims, 11 Drawing Sheets

(51) Int. Cl.
  *B32B 3/30* (2006.01)
  *B32B 7/05* (2019.01)

(56) References Cited

U.S. PATENT DOCUMENTS

| | | | |
|---|---|---|---|
| 5,041,317 A | 8/1991 | Greyvenstein | |
| 5,261,466 A | 11/1993 | Koyanagi | |
| 5,335,996 A * | 8/1994 | Cortopassi | B65D 31/02 |
| | | | 229/87.05 |
| 5,427,830 A * | 6/1995 | Pharo | B65D 81/052 |
| | | | 428/35.2 |
| 5,558,262 A | 9/1996 | Simhaee | |
| 5,862,914 A | 1/1999 | Farison et al. | |
| 6,135,281 A | 10/2000 | Simhaee | |
| 6,276,532 B1 | 8/2001 | Sperry et al. | |
| 6,447,864 B2 | 9/2002 | Johnson et al. | |
| 6,696,127 B1 | 2/2004 | Mitchell, Jr. | |
| 6,789,376 B1 | 9/2004 | Greenwood et al. | |
| 6,955,846 B2 | 10/2005 | Lerner | |
| 7,093,978 B2 | 8/2006 | Tan | |
| 7,165,677 B2 | 1/2007 | Tanaka et al. | |
| 7,513,090 B2 | 4/2009 | Wehrmann | |
| 7,526,904 B2 | 5/2009 | Fuss et al. | |
| 7,862,870 B2 | 1/2011 | Gavin et al. | |
| 7,897,219 B2 | 3/2011 | Wehrmann | |
| 7,926,507 B2 | 4/2011 | Wetsch et al. | |
| 8,061,110 B2 | 11/2011 | Wetsch | |
| 8,128,770 B2 | 3/2012 | Wetsch et al. | |
| 8,424,552 B2 | 4/2013 | Wetsch et al. | |
| 8,454,779 B2 | 6/2013 | Wetsch et al. | |
| 8,978,693 B2 * | 3/2015 | Frayne | F16K 15/20 |
| | | | 137/512 |
| 9,205,622 B2 | 12/2015 | Wehrmann | |
| 9,266,300 B2 | 2/2016 | Chuba | |
| 9,844,911 B2 | 12/2017 | Corbin et al. | |
| 10,131,094 B2 | 11/2018 | Shook et al. | |
| 2002/0166788 A1 | 11/2002 | Sperry et al. | |
| 2003/0108699 A1 * | 6/2003 | Tanaka | B65D 81/052 |
| | | | 428/35.2 |
| 2003/0138583 A1 * | 7/2003 | Lorsch | B31D 5/0073 |
| | | | 428/36.9 |
| 2004/0163991 A1 | 8/2004 | Koyanagi et al. | |
| 2005/0109656 A1 | 5/2005 | Ishizaki | |
| 2005/0266189 A1 | 12/2005 | Wehrmann | |
| 2006/0042191 A1 | 3/2006 | Lerner et al. | |
| 2006/0191817 A1 | 8/2006 | Nishi et al. | |
| 2006/0233467 A1 * | 10/2006 | Mize, Jr. | B65D 81/264 |
| | | | 383/37 |
| 2007/0081745 A1 | 4/2007 | Tetenborg et al. | |
| 2008/0141620 A1 | 6/2008 | Szabo | |
| 2008/0197041 A1 * | 8/2008 | Jian | F16F 9/0418 |
| | | | 206/522 |
| 2009/0110864 A1 | 4/2009 | Wehrmann et al. | |
| 2009/0293427 A1 | 12/2009 | Lerner et al. | |
| 2010/0218888 A1 | 9/2010 | Cooper et al. | |
| 2010/0282824 A1 | 11/2010 | Kannankeril et al. | |
| 2011/0049001 A1 | 3/2011 | Won | |
| 2011/0172072 A1 | 7/2011 | Wetsch et al. | |
| 2011/0233101 A1 | 9/2011 | Baines | |
| 2011/0247725 A1 * | 10/2011 | Frayne | B31D 5/0073 |
| | | | 141/10 |
| 2011/0293864 A1 | 12/2011 | Perkins et al. | |
| 2012/0187010 A1 | 7/2012 | Speith-Herfurth et al. | |
| 2013/0047552 A1 | 2/2013 | Cocciadiferro | |
| 2014/0261752 A1 | 9/2014 | Wetsch | |
| 2014/0261871 A1 | 9/2014 | Wetsch | |
| 2014/0346079 A1 * | 11/2014 | Gess | B65D 81/052 |
| | | | 206/522 |
| 2015/0033669 A1 * | 2/2015 | Dobreski | B32B 27/306 |
| | | | 53/403 |
| 2015/0069106 A1 | 3/2015 | Wehrmann | |
| 2016/0137383 A1 | 5/2016 | Wetsch et al. | |

* cited by examiner

FLEXIBLE STRUCTURE WITH PERFORATION-FREE INFLATION CHANNEL

CROSS-REFERENCE TO RELATED APPLICATIONS

This application claims the benefit of U.S. Provisional Application No. 61/979,494 filed on Apr. 14, 2014 entitled "Flexible Structure With Perforation-Free Inflation Channel," the content of which is hereby incorporated by reference in its entirety.

TECHNICAL FIELD

The present disclosure relates to inflatable flexible structures.

BACKGROUND

Flexible structures, such as inflatable air cushions or bags, are used to provide added protection to an object during packaging. One type of air cushion is typically made by sealing plastic sheets to form an engaged series of flexible, plastic, tubular portions that can be connected and adjoined in parallel to or in series with each other. An inflation conduit can direct air to the tubular portions via one-way check-valves to inflate the tubular portions and maintain them in an inflated state. Once inflated, the air cushion is typically configured to surround the object that is to be protected, such as by forming a pocket in which the object is placed and then folding over a portion of the inflated air cushion to secure the object therein. An example of such an air cushion is the AIRSPEED® CHAMBERPAK™ by Pregis Corporation. Descriptions of other examples of inflatable air cushions can be found in, for example, U.S. Pat. No. 5,261,466, and U.S. Application Publication Nos. 2003/0108699, 2004/0163991, and 2005/0109656.

Typically, flexible structures used in the industry have perforations that extend across the conduit utilized to inflate the structure. Air is, however, able to escape the perforations in this region which causes greater air pressures to be used to inflate the chambers of the flexible structures. Also as the conduits are inserted onto and down some nozzles, the nozzles encounter the perforations causing interference, tears, or other negative side effects.

Thus, there is a need for inflatable flexible structures, such as inflatable air cushions that are easily separable and have strength in both the transverse and longitudinal direction.

SUMMARY

In accordance with various embodiments, an inflatable cushion may include a first film ply extensive in a longitudinal direction and a lateral direction and a second film ply extensive in the longitudinal direction and the lateral direction. The second film ply is overlaid on and sealed to the first film ply. The film plies define therebetween: an inflation region extending longitudinally, and a plurality of chambers extending transversely in fluid communication with the inflation region. The inflation region being operable to enable filling of the chambers with fluid injected into the inflation region. One or more lines of weakness may extend transversely through the plies and less than completely across the plies. The lines of weakness may be configured to facilitate tearing through the plies to separate portions of the inflatable cushion.

In accordance with various embodiments, the lines of weakness extend across a portion of the plies, excluding the inflation region. A strip of material may be defined by a portion of the plies not crossed by the one or more lines of weakness. The strip of material may connects the portions of the plies that are separated by torn lines of weakness. The lines of weakness may be more easily torn than the strip of material. The strip of material may be the inflation region. The lines of weakness may separate the chambers. When torn at the lines of weakness, the chambers may form fingers being connected to one another at the strip of material. A first finger and a second finger may have different longitudinal widths. The lines of weakness may extend all the way to one edge of the first film ply but not the opposite edge of the first film ply.

In accordance with various embodiments, the inflation region may include unattached edges of the first and second film plies proximal to a first longitudinal edge with a longitudinal connected portion positioned parallel and adjacent thereto. The first and second film plies may include a first longitudinal connected portion positioned proximal to a first longitudinal edge with a second longitudinal connected portion positioned parallel and adjacent thereto, with the first longitudinal seal and the second longitudinal seal defining the inflation region. The inflation region may be a longitudinal conduit operable to receive a nozzle.

In accordance with various embodiments, the first film ply and the second film ply may include a plurality of transverse seals spaced along the longitudinal direction. The adjacent transverse seals may define the longitudinal edges between the plurality chambers. The at least one of the lines of weakness may extend through at least one of the transverse seals. The a one-way valve that fluidly connects the inflation region with one of the fluid chambers, allowing for one-way only air flow from the inflation region to the chamber. The inflatable cushion may also include third and fourth film plies disposed between the first and second film plies, defining a plurality of said one way valves.

In accordance with various embodiments, the one or more lines of weakness may be defined by perforations formed from slits that have portions that extend in a direction that has both a longitudinal and a transverse component. The slits may extend through one of at least the first film ply or the second film ply with each end of the slits proximate to an end of an adjacent slit thereby forming a line of slits transversely across the first film ply and the second film ply. The slit may be a straight slit. The slit may be a chevron shaped slit. The slit may be a straight slit. The one or more lines of weakness may be defined by perforations formed from transverse straight slits. The first film ply and the second film ply may be made of a bi-directional blown polymer material.

DETAILED DESCRIPTION

Figure 1A:
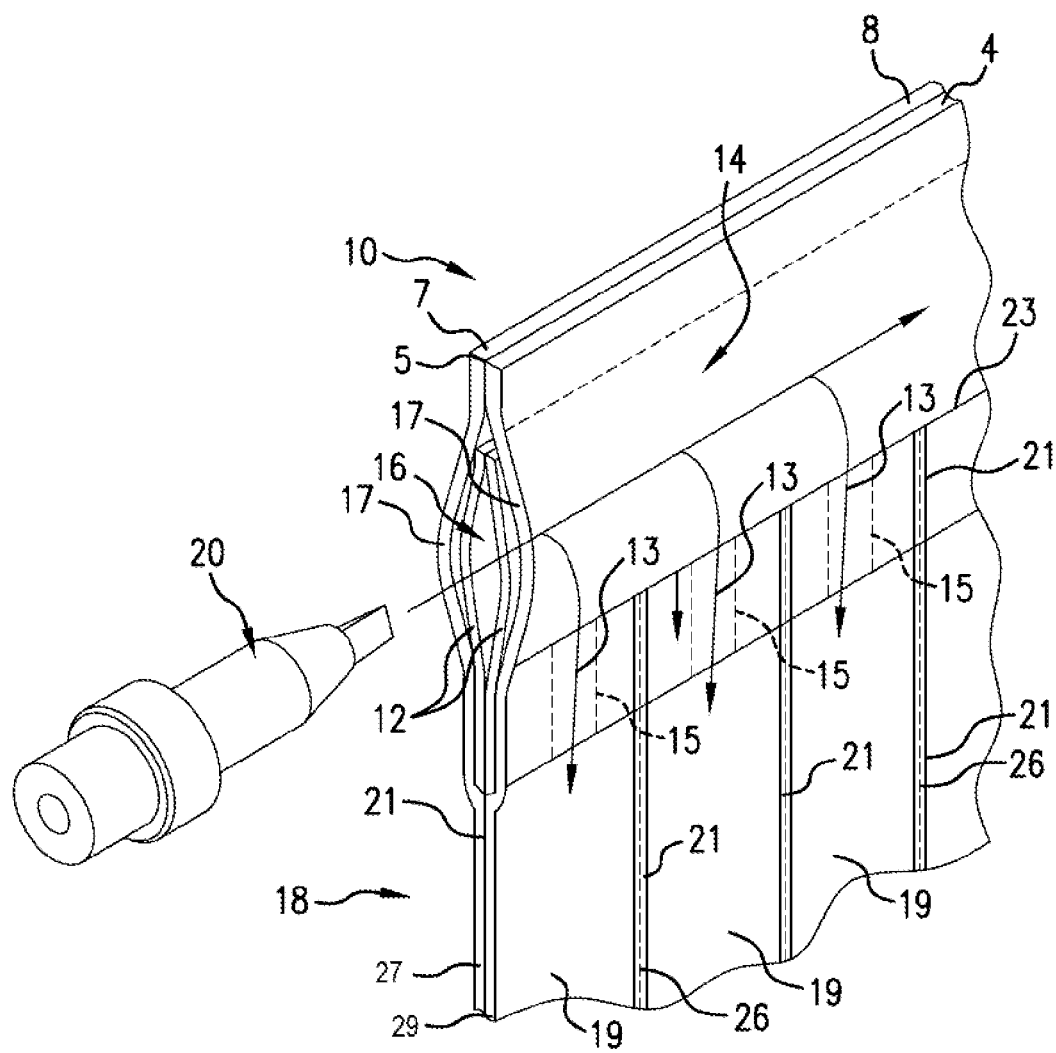
FIG. 1A is a perspective schematic of a flexible structure having one way valves and nozzle with transverse perforations in accordance with various embodiments.

The present disclosure is related to systems used as cushioning or protection for packaging and shipping goods. Illustrative embodiments will now be described to provide an overall understanding of the disclosed apparatus. Those of ordinary skill in the art will understand that the disclosed apparatus can be adapted and modified to provide alternative embodiments of the apparatus for other applications, and that other additions and modifications can be made to the disclosed apparatus without departing from the scope of the present disclosure. For example, features of the illustrative embodiments can be combined, separated, interchanged, and/or rearranged to generate other embodiments. Such modifications and variations are intended to be included within the scope of the present disclosure.

As shown in FIG. 1, 3-6, a flexible structure, such as a multi-layer film 10, for inflatable cushions 18 is provided. In various embodiments, the air cushion 18 may be made up of the film 10, with the film 10 being made up of one or more layers of materials which are discussed in more detail below. The film 10 may form walls 17 of the air cushion 18. Multiple walls 17 may be utilized to form the air cushion 18. For example, the air cushion 18 may be defined by two or more walls 17. One wall 17 may be an outer first wall 5 having a first longitudinal edge 2 and a second longitudinal edge 4. A second wall 17 may be a second outer wall 7 having a first longitudinal edge 6 and a second longitudinal edge 8. The second outer wall 7 may be aligned to be overlapping and can be generally coextensive with the first outer wall 5, i.e., at least respective first longitudinal edges 2, 6 are aligned with each other and/or second longitudinal edges 4, 8 are aligned with each other.

The first and second walls 5, 7 can be formed from the first and second plies 27, 29. The first and second walls 5, 7 can be formed from a single sheet of material, a flattened tube of film material with one or more edges slit, or two sheets of film material. For example, the first and second walls 5, 7 can include a single sheet of film material that is folded to define the joined second edges 4, 8 (e.g., "c-fold film"). The c-folding film material 10 can form the first and second plies 27, 29. The fold forms a connected portion of the film operable to define an inflation region or any other edge or center of the inflatable structure. Alternatively, for example, the first and second walls 5, 7 can include a tube of film material (e.g., a flattened tube) that is slit along the aligned first longitudinal edges 2, 6 and/or the second longitudinal edges 4, 8. The flattened tube may also be used without slitting an edge but using the edges as connected portions. The flattened tube can form the first and second plies 27, 29. Also, for example, the first and second walls 5, 7 can include two independent sheets of film material joined, sealed, or otherwise attached together along the aligned second edges 4, 8. The two independent sheets of film material can be the first and second plies 27, 29.

In accordance with various embodiments, the plies, walls, structures, etc., discussed herein may be sealed together (e.g., to form transverse seals 21 and/or longitudinal seals 23, 30, 32) to form the described structures with any process such as adhesively bonding, friction, welding, fusion, heat sealing, laser sealing, and ultrasonic welding. In various embodiments, an adhesive suitable to connect separate portions of the materials discussed herein may be utilized. The adhesive may be a pressure sensitive, time dependent, evaluative, radiation sensitive, or other forms of adhesives. For example, the adhesive may be cured by exposing the adhesive to an electromagnetic radiation. The adhesive may be sensitive to electromagnetic radiations in specific areas of the electromagnetic radiation spectrum. For example, the adhesive may be a ultraviolet light (UV) curable adhesive. The adhesives may be applied to the plies, walls, or other structures discussed herein by painting, printing, rolling, etc. An adhesive that is operable to seal the inflation chambers sufficiently to contain gas under shipping pressures may be suitable. These pressures may be those formed by stacking the flexible structure under multiple layers of the shipped product or other environmental pressures on the flexible structure internal or external that would occur during shipping, storage, or use. As discussed herein any of the seals may be made by just heat sealing, just adhesive sealing, both types of sealing, or any other type of sealing.

In accordance with various embodiments, the film plies 27, 29 may be comprised of a single layer of material or various layers of materials manufactured in a variety of different ways. Some of these materials may include any of a variety of polymer resins. Polymer resin can be extruded as a film by either a cast film extrusion process or a blown film extrusion process. In cast extrusion, the polymer is forced through a narrow, linear, slit in a die. In the blown film extrusion process the die and slit are circular. These two methods result in sheet films (cast film) or a tube film, also called a bubble (blown film process).

Stretching of a heated resin results in orienting crystals within the polymer—a process called orientation. In the case of cast films, the stretching occurs in the direction that the resin is extruded, which is the machine or longitudinal direction. Orientation helps to improve properties such as modulus and tensile strength. Orientation may also help improve gloss and barrier properties of the extruded films. However, orientation may have an adverse effect on other properties, for example, tear strength.

Blown films may also be oriented. In the case of blown films, however, orientation may occur in both the machine (longitudinal) direction and the transverse (non-longitudinal) direction, which can result in a material that is equally resistant to tension in any direction. These materials are referred to bi-directional, although because they are equally strong in all directions, they can be referred to as non-directional. Bi-directional can be not substantially weaker in one direction than it is in the other directions. For example, bi-directional material can be material that is substantially equally strong along two or more axes. In some embodiments, bi-directional can mean material that is substantially equally strong in every direction.

The bi-directional material results from blowing because the bubble of film is stretched in the machine direction, as it extends away from the die, and the bubble is stretched outward in a transverse, as the diameter of the bubble is extended beyond that of the die's diameter. Orientation is often controlled by adjusting the bubbles "blow up ratio." The blow up ratio (BUR) is the ratio of bubble diameter to the die diameter; and indicates the amount of stretching the polymer is undergoing during the shaping of the film. Blow Up Ratio (BUR)=(0.637×Lay-Flat Width)/Die Diameter, where: Lay-Flat is the width of the collapsed film, and Die Diameter is the fixed diameter of the die.

One the other hand, typical cast-extrusion films are oriented in a single direction (the machine direction), and another process would need to be conducted to result in a bi-directional material. As a result, the single-directional material can withstand far greater tension along the machine direction than along a transverse direction.

Thus, blown films can be bi-directionally oriented. The physical properties of the blown film are controlled by balancing orientation in both the machine and transverse direction. Controlling the shape of the blown bubble aids in balancing film properties by imparting more or less bi-axial molecular orientation in the film. In some cases, the orientation in the transverse direction, non-longitudinal (TD) can be altered to match that of the machine or longitudinal direction (MD, LD) orientation.

In accordance with various embodiments, the film 10 may comprise film plies 27, 29, which may be bi-directionally oriented film plies 27, 29. As discussed below, a bi-directionally oriented ply 27 or 29 (hereinafter "27, 29") may in some embodiments include a system of perforations extending transversely across the ply 27, 29 i.e. in the non-longitudinal direction. This type of perforation may allow the sheet to be separated into individual pads or sheets with a single continuous inflation process. In various embodiments, the film plies 27, 29 is not perforated the entire way across the transverse direct (e.g. the perforations may not extend across the inflation conduit). However, use of a blown extrusion process in creating this type of film ply may aid in separating the individual portions of films between the perforations because the bi-directionally oriented ply has a lowered tear strength in the transverse direction due to the increased transverse orientation of the blown film ply.

The presently disclosed films may include plies 27, 29 having multiple layers. These multilayer plies 27, 29 may be used in protective packaging. In some embodiments, the multilayer plies 27, 29 are used in making air cushions or air pillows.

Figure 2A:
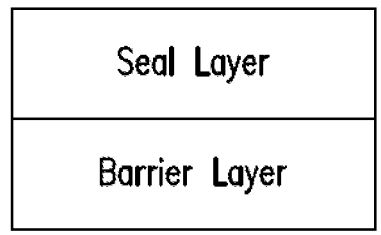
FIGS. 2A-E are schematic representations of layers within the ply in accordance with various embodiments.
Figure 2B:
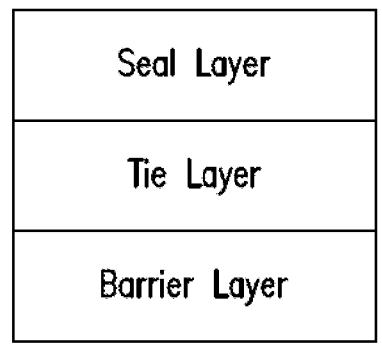

In some cases the multilayer films comprise a gas barrier layer and a seal layer as shown in FIG. 2A. The seal and gas layers may be adhered directly to each other (See FIG. 2A) or an adhesive, tie layer, may be positioned between the gas barrier layer and the seal layer as shown in FIG. 2B. In many cases, a multilayer film lacking a tie layer displays enhanced adhesion properties between the gas barrier layer and the seal layer. In embodiments lacking a tie layer, the seal layer is a mixture of polymer compounds, wherein the resulting resin has a superior adhesive property with respect to the gas barrier layer.

A multilayer film embodiment may not require a tie or adhesive layer to be positioned between the gas barrier layer and the seal layer (See FIG. 2A). Rather, the seal layer is configured to adhere directly to the gas barrier layer, because it has characteristics relevant to its adhesion to the barrier layer. In these embodiments, the seal layer's characteristics have been modified to be more compatible with those of the gas barrier layer. The characteristics of the gas barrier layer can be modified, for example, by blending in an adhesion modifier material to provide the seal layer with enhanced adhesion properties for adhering to the material of the barrier layer. In some embodiments, the adhesion modifier is blended in under conditions encountered during a coextrusion process. In some embodiments, the adhesion modifier material can be tie layer material that was previously provided as an independent layer to adhere a seal layer to a barrier layer.

Multilayer films lacking a tie layer positioned between a seal layer and a barrier layer may provide for more efficient and economical production of multilayer barrier films. In many embodiments, the disclosed film may be manufactured using less complex methods and machinery. In many embodiments, the disclosed film may be manufactured using two resins and a three-layer-die co-extruder. Thus, the disclosed film and methods allow for production of films with lower costs. In some cases, the use of fewer layers may allow for films of lower thickness.

Figure 2C:
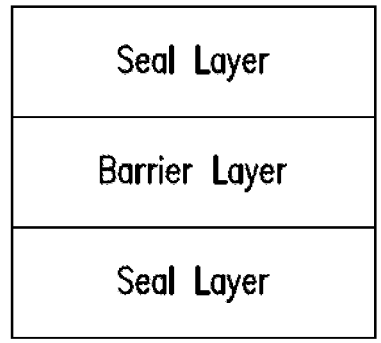
Figure 2D:
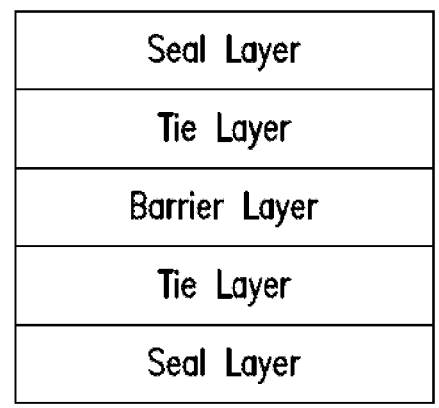
Figure 2E:
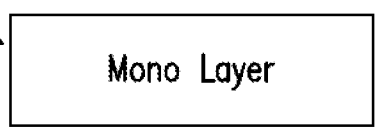

Layers and sublayers in the disclosed films may be arranged symmetrically. For example, in embodiments comprising a barrier layer, there may be an equal number of seal layers on either side of the barrier layer as shown in FIGS. 2C and 2D. In some embodiments, the symmetry is based on thickness rather than number of layers or sublayer, for example one side of a barrier layer may have more seal sublayers, but the sublayers may comprise the same thickness as the seal sublayers on the opposite side of the barrier layer. A symmetrical arrangement may aid in keeping the film flat, as opposed to bending out of plane or becoming wavy. Other films may be asymmetrical in number or thickness of sublayers. In some embodiments an asymmetric film may comprise a seal layer and a barrier layer, wherein the seal layer comprises one outer surface of the film and the barrier layer comprises the other outer surface (See FIG. 2A).

Sublayers that are coextruded together and that are of the same material typically function as a single layer. In many embodiments, each layer or sublayer is typically provided by a single, feed channel in the extruder. The layers and sublayers produced by each feed channel are coextruded from the extruder die to produce the multilayer film, with any sublayers combining to form layers. Thus an embodiment with three layers may be formed using a die having three or more feed channels, with the additional feed channels containing a same or similar polymer as an adjacent feed channel to produce sublayers of one or more layers. In various embodiments, the die coextruder can have an even number or odd number of feed channels. In various embodiments, the number of channels in a die may be 3 or greater, for example 4, 5, 6, 7, or more. In some cases, the number of channels in a die may be significantly greater than the number of layers in the multilayer film.

In embodiments having a barrier layer in the multilayer film, the barrier layer may be made of materials that have elevated impermeability to air or the fluid that is desired to be contained by the film. In some embodiments, the barrier layer may comprise two or more sublayers with the same or similar composition, and in other embodiments, the barrier layer can include different compositions.

In accordance with various embodiments, the film plies 27, 29 may be comprised of a single layer or a mono layer as shown in FIG. 4E. In one example the monolayer may be formed of polyethylene and may serve as a layer that seals to other layers and also as a barrier to keep the fluid contained within the assembled films.

Polymers

The disclosed multilayer films include layers made from polymers of differing compositions. In some embodiments, the disclosed layers may be selected from ethylene, amide, or vinyl polymers, copolymers, and combinations thereof.

The disclosed polymers can be polar or non-polar. As used herein, a polar molecule refers to a polymer or molecule on the polymer having an electric charge in some environments. A polar molecule or polymer may interact with other polar molecules by, for example hydrogen bonding. Polarity of a molecule often affects other characteristics, such as melting point. In some embodiments, a polar polymer may have groups with oppositely charged atoms.

The disclosed ethylene polymers may be substantially non-polar forms of polyethylene. In many cases the ethylene polymer may be a polyolefin made from copolymerization of ethylene and another olefin monomer, for example an alpha-olefin. The ethylene polymer may be selected from low, medium, high density polyethylene, or a combination thereof. In some cases the density of various polyethylenes may vary, but in many cases, the density of low density polyethylene may be for example from about 0.905 or lower to about 0.930 g/cm3, the density of medium density polyethylene may be for example from about 0.930 to about 0.940 g/cm3, and high density polyethylene may be for example about 0.940 to about 0.965 g/cm3 or greater. The ethylene polymer may be selected from linear low-density polyethylene (LLDPE), metallocene linear low density polyethylene (mLLDPE), high density polyethylene (HDPE), medium density polyethylene (MDPE), and low density polyethylene (LDPE).

In some embodiments the polar polymer may be a non-polar polyethylene which may be modified to impart a polar characteristic. In other embodiments the polar polymer is an ionomer (e.g. copolymers of ethylene and meth acrylic acid, E/MAA), a high vinyl acetate content EVA copolymer, or other polymer with polar characteristics. In one embodiment the modified polyethylene may be anhydride modified polyethylene. In some embodiments, the maleic anhydride is grafted onto the olefin polymer or copolymer. Modified polyethylene polymers may react rapidly upon coextruding with polyamide and other ethylene containing polymers (e.g., EVOH). In some cases a layer or sublayer comprising the modified polyethylene may form covalent bonds, hydrogen bonds and/or dipole-dipole interactions with other layers or sublayers, for example sublayers or layers comprising a barrier layer. In many embodiments, modification of a polyethylene polymer may increase the number of atoms on the polyethylene that are available for bonding, for example modification of polyethylene with maleic anhydride adds acetyl groups to the polyethylene, which may then bond with polar groups of the barrier layer, for example hydrogen atoms on a nylon backbone. Modified polyethylene may also form bonds with other groups on the nylon backbone as well as polar groups of other barrier layers, for example alcohol groups on EVOH. In some embodiments, a modified polyethylene may form chain entanglements and/or van der Waals interactions with an unmodified polyethylene.

Mixtures of ethylene and other molecules may also be used. For example, ethylene vinyl alcohol (EVOH) is a copolymer of ethylene and vinyl alcohol. EVOH has a polar character and can aid in creating a gas barrier. EVOH may be prepared by polymerization of ethylene and vinyl acetate to give the ethylene vinyl acetate (EVA) copolymer followed by hydrolysis. EVOH can be obtained by saponification of an ethylene-vinyl acetate copolymer. The ethylene-vinyl acetate copolymer can be produced by a known polymerization, such as solution polymerization, suspension polymerization, emulsion polymerization and the like, and saponification of ethylene-vinyl acetate copolymer can be also carried out by a known method. Typically, EVA resins are produced via high pressure autoclave and tubular processes.

Polyamide is a high molecular weight polymer having amide linkages along the molecular chain structure. Polyamide is a polar polymer. Nylon polyamides, which are synthetic polyamides, have favorable physical properties of high strength, stiffness, abrasion and chemical resistance, and low permeability to gas, for example oxygen.

Polymers and co-polymers disclosed herein may include various additives. In some cases additives may be added during the extrusion process. In some embodiments, the additives may be colorant, anti-stats, nanoparticles, nanoparticle clay, anti-fog, filler, talc, starch, $CaCO_3$, slip and/or anti-block. The additives may be incorporated into the resin, or may be incorporated during extrusion. In some embodiments, additives may aid in modifying a barrier layer, for example to decrease oxygen transfer. In some embodiments, additives, for example slip and/or anti-block, may aid in controlling friction and/or adhesion of a film surface. In some cases, slip and/or anti-block may aid in controlling friction and/or adhesion of adjacent film surfaces.

Seal Layer

The seal layer may be selected to allow the multilayer film to be sealed to another film ply of the same or similar composition. For example, the other ply can be provided by folding the multilayer film over onto itself. The seal layer can be sealed to another similar seal layer by a suitable method, including sonic, heat, or adhesive sealing.

The seal layer in one embodiment is made of or made primarily of a polyethylene resin. In some embodiments, the seal layer is selected from LDPE (low density polyethylene), LLDPE (linear-low density polyethylene), mLLDPE (metallocene linear-low density polyethylene), HDPE (high density polyethylene), or a combination thereof.

The seal layer can be a mixture or blend of modified and unmodified polyethylene. Modified polyethylene can be created by grafting one or more molecules onto the polyethylene to help impart a polar character to the polyethylene. In some embodiments, the molecule is maleic anhydride onto a polyolefin or polyethylene. In some cases the modified polyethylene is modified LDPE or LLDPE. The principal seal layer material typically has poor interlayer adhesion to a barrier layer, that is, the typical seal layer does not adhere well to the barrier layer in an extrusion process.

One embodiment, as shown in FIG. 2A, of the disclosed film is a multilayer film comprising a seal layer and a barrier layer. In some embodiments, the multilayer film lacks a tie layer positioned between the seal layer and barrier layer. In these embodiments, the seal layer is modified to improve its adhesion to the barrier and enhance interlayer adhesion. In an embodiment, the modified polyethylene adheres significantly better to the barrier layer resin than unmodified polyethylene. In some cases the modified polyethylene may be characterized based upon the level of anhydride as high, medium, or low maleic anhydride content resin. Alternative materials can be used that can be heat sealed to another layer of another ply of film.

In multilayer films comprising a barrier layer without a tie layer, the seal layer principal material may be modified to enhance a material property, for example its polar character. In these embodiments, the seal layer may be modified such that it is less non-polar. For example, the polar character of a seal layer may be modified such that it is more similar to that of a barrier layer, than to a non-modified seal layer. In many embodiments, the seal layer resin containing modified polyethylene is significantly more polar than the polarity of a seal layer lacking modified polyethylene, which is non-polar. Thus a blended resin will produce a seal layer of polymer chains that have non-polar character (non-modified polyethylene) and polymer chains that have polar character (modified polyethylene). The degree of polarity of a seal layer from a blended resin may be affected by the level of modification (which may be described as high, medium, or low) and/or the relative concentration of modified polyethylene in the blended resin. In many embodiments, a seal layer includes a polyethylene polymer with polar atoms or groups. The level of modification may reflect the number of polar atoms or groups per polymer and/or the type of polar atom or group.

In multilayer films comprising a barrier layer without a tie layer, the seal layer may be a blend of modified and unmodified polyethylene. In many embodiments the modified polyethylene is modified to increase the number of polar atoms or groups on the polyethylene. In many embodiments, each seal layer of the disclosed multilayer film comprises a mixture of anhydride modified polyethylene and unmodified polyethylene. In some cases, the ratio of modified to unmodified polyethylene is about 0.5-3:9.5-7. In one embodiment the ratio is 1:9. In another embodiment the ratio may be 1:4. Alternative embodiments use other suitable ratios. The amount of modified polyethylene in a seal layer may be selected to provide a desired level of adhesiveness to the barrier layer, sealability, and/or durability of the multilayer film. In many cases, adhesiveness of the seal layer is increased by increasing the amount of anhydride modified polyethylene or increasing levels of maleic anhydride in the modified polyethylene.

In some cases a blended resin includes anhydride modified LLDPE and unmodified LLDPE. In some cases the level of anhydride in the modified LLDPE may be high, medium, or low. The percentage or amount of modified polyethylene in the blended resin may be adjusted depending upon the level of anhydride content in the modified polyethylene resin and the desired adhesiveness of the seal layer. In most cases, higher content maleic anhydride content will enhance the adhesiveness of the blended resin layer. In some cases where the modified polyethylene is high content maleic anhydride, the ratio of modified polyethylene to unmodified polyethylene may be low. In cases where the modified polyethylene is low content maleic anhydride, the percentage of modified polyethylene may be higher.

In many cases, wherein the seal layer comprises a blend of modified and unmodified polyethylene, the melting temperature of the blended resin can be more than about 400° F. In some cases, the blended resin can have a melting temperature of about 425° F., or between about 410-440° F. In some cases the melting temperature of the blended resin may be selected to aid in increasing adhesion between the barrier and seal layers. In some cases, the adhesiveness of the blended resin layer may decrease with lower melt temperatures. In some embodiments the melting temperature of a barrier layer resin, such as one containing nylon and/or EVOH, is typically higher than the melting temperature of a seal layer resin, and in some embodiments it may aid in creating the multilayer film to raise the melt temperature of the seal layer. In many cases, a seal layer with a higher melting temperature may require heating the film to a higher temperature to achieve a seal.

Barrier Layer

The disclosed film may include one or more barrier layers that create a gas barrier. In some embodiments, the barrier layer is made from a resin that is less permeable to a given gas than other layers of the multilayer film. In some cases the gas may be ambient or pressurized air, or a constituent of air, for example, oxygen, nitrogen, carbon dioxide, etc., or a combination thereof. In many embodiments, a gas barrier layer may comprise a polymer selected from ethylene-vinyl alcohol copolymer, polyamides, other suitable polymer, or a combination thereof. The thickness of the barrier layer may be varied to create an effective barrier to the transmission of a gas through the multilayer film, provide the multilayer film with sufficient strength, provide the multilayer film with sufficient durability, or a combination of these qualities. The use of a polyamide in the barrier layer may help increase the durability of the disclosed multilayer film.

The material of the barrier layer, when selected for its impermeability, can be selected based on its oxygen transfer rate ("OTR"). OTR may be measured by testing procedures well known in the art, for example ASTM D3985. In most cases, the OTR is less than about 100 cc/100 in.2/day. In some embodiments the OTR is less than about 30, 20, or 10. Nylon polymers and copolymers (for example Nylon 6, Nylon 6/6.6, etc.) and/or ethylene vinyl alcohol (EVOH of varying ethylene content, for example 38% ethylene or from about 15%-50% ethylene) can be used as a gas barrier, for example, although alternative embodiments can use other suitable barrier layers.

In some embodiments, the barrier polymer may be blended with polyethylene, for example nylon or EVOH may be blended with polyethylene and/or a polar polymer (e.g. modified polyethylene, ionomer, or high vinyl acetate content EVA copolymer). In some cases, nylon or EVOH is blended with LLDPE and/or modified LLDPE to form the barrier layer. In many embodiments, wherein polyethylene (modified and/or unmodified) is blended into the barrier layer, the amount of polyethylene in the barrier layer is less than about 25%, and may be less than about 10%. In the various embodiments, the thickness of the barrier layer selected to be sufficient to provide the desired air impermeability, and also toughness, tear resistance, and durability to the film.

In various embodiments, the barrier layer can have a plurality of sublayers that are of similar or different materials. For instance, several sublayers of a same material can be coextruded from adjacent channels in the extruder die. In one embodiment having dissimilar materials forming the barrier sublayers, the barrier has sublayers of nylon and EVOH, such as with a nylon sublayer sandwiched between EVOH layers, or an EVOH sublayer sandwiched between nylon layers. As described above, these barrier sublayers may be blended with other polyethylene polymers to create the sublayer. The barrier layer is typically the inner or core layer, and the seal layer is typically the outer layer of the film plies, although an alternative embodiment has a first barrier layer sandwiched between the seal layer and a second barrier layer. In most cases, the multilayer film comprises a barrier layer, or sublayers, that occupy the center channel(s) of a die and may be sandwiched between a similar number of seal layers. For example, a seven layer die extruder may have the barrier layer at layer 4 and seal layers at layers 1-3 and 5-7. In other cases barrier sublayers may be offset, for example barrier layers may be fed into a seven channel die at channel layer 3, while the seal layers are fed into the die at channel layers 1, 2, 4, 5, 6, and 7. In these and some other embodiments the thickness of the seal layers are not symmetrical. That is, one seal layer is thicker than the other. In some cases the seal layers on one side of the barrier layer may comprise fewer or more sublayers than the seal layer on the opposite side. In other embodiments, the film may comprise a single barrier layer and a single seal layer, both of which may comprise sublayers.

Tie Layer

The multilayer film, as shown in FIG. 2B, may comprise a seal layer and a barrier layer, with a tie layer positioned between the seal layer and barrier layer. In these embodiments, the composition of the tie layer is a modified polyethylene having characteristics of both the barrier layer and the seal layer, so that it may more readily adhere to both the barrier layer and the seal layer with sufficient strength. In these cases, the adhesiveness of the tie layer may be controlled, for example by changing the amount of modified polyethylene in the tie layer, for example, by changing the content of maleic anhydride in the modified polyethylene.

Modified polyethylene can be created by grafting one or more molecules onto the polyethylene to help impart a polar character to the polyethylene. In some embodiments, the molecule is maleic anhydride onto a polyolefin or polyethylene. In some cases the modified polyethylene is modified LDPE or LLDPE. The principal seal layer material typically has poor interlayer adhesion to a barrier layer, that is, the typical seal layer does not adhere well to the barrier layer in an extrusion process. In most cases, higher content maleic anhydride content will enhance the adhesiveness of the tie layer to the barrier layer. The tie layer may have high, medium, or low content maleic anhydride. Other tie-layers and modifying agents, well known in the art, may be used to create a tie layer.

Seal-Barrier Layer Adhesion

The multilayer film plies 27, 29 may comprise a seal layer in contact with the barrier layer as shown in FIG. 2A. In these embodiments, the composition of the disclosed seal layer is modified so that it may more readily adhere to the barrier layer with sufficient strength, without an adhesive layer positioned between the barrier and seal layer. In these cases, the adhesiveness of the seal layer may be controlled, for example by changing the amount of modified polyethylene in the seal layer, for example, by changing the content of maleic anhydride in the modified polyethylene, and/or by changing the melt temperature of the seal layer. One embodiment of the disclosed film is described in U.S. patent Ser. No. 14/101,104, filed Dec. 9, 2013, titled Multilayer Film With Enhanced Interlayer Adhesion.

In many cases, the amount of modified polyethylene and unmodified polyethylene blended to provide the polyethylene resin of the seal layer is selected to provide a very high peel force necessary to separate the seal and barrier layers to prevent delamination or ensure that it rarely occurs. In some embodiments, the interlayer adhesion is sufficiently high that a peel force cannot be accurately measured. In most embodiments, the adhesion bonding between the barrier layer and seal layer may be measured such as by a standard 180° peel strength test, in which a layer is pulled back over itself. In most embodiments, the peel strength of the presently claimed multilayer material is greater than about 200 grams force. In some embodiments the interlayer adhesion is a high-adhesion bonding to render a peel strength of greater than about 400 grams force measured by standard, ASTM, 180° peel strength testing. In some cases the peel strength may be expressed in lb./in. or N/cm, and the peel strength of the presently claimed multilayer material is greater than about 0.5 or 1.0 lb./in, or about 0.9 or 1.75 N/cm, such as measured in a T-peel test (e.g., ASTM D1876). In various cases, the T-peel strength of the claimed multilayer film is above 2 or 2.5 N/cm, and in some cases the peel strength (e.g. T-peel or 180° peel) is higher than the tensile strength of one or both layers so that the layers themselves break before they peel from each other. In such blended resins comprising modified and unmodified polyethylene, the two polyethylenes may entangle and/or bond via van der Waals interactions during extrusion. The modified and unmodified polyethylene can be provided as a mixture of solid pellets particulates, such as regrind, pellets, or other particulates into the extruder.

The seal layer can be extruded as a plurality of sublayers having the same or similar composition. Multiple adjacent extrusion die channels can be used to co-extrude the multiple sublayers that bond to form the single seal layer. Such co-extrusion can be performed to result in a seal layer that has similar characteristics and behaves as does a monolayer seal layer that is extruded through a single layer die.

Bonding between seal layer and barrier layers may be via covalent or non-covalent bonds depending on the materials used. In some cases, non-covalent bonding may include hydrogen bonding, ionic bonding, electrostatic bonding, van der Waals bonding, and hydrophobic interactions. In some cases, for example where the seal layer comprises anhydride modified polyethylene and is positioned next to a barrier layer of EVOH or polyamide, anhydride groups of the modified anhydride covalently bond to hydroxyl groups of the barrier layer, and hydrogen bonding occurs between the anhydride groups and the amide or hydroxyl groups of the barrier layer.

Typical multilayer films have a thickness of about 0.5-2 mil, more typically about 0.75-1.25 mil, and typical films have an overall thickness of about 1 mil. Typically, the thickness of an individual layer is between about 1% and 99% of the total thickness of the multilayer film. Typically, where the film includes a barrier layer, the barrier layer may be between about 1% and 20% of the total thickness of the multilayer film, and typically the seal layers may be between about 99% and 50% of the total thickness of the multilayer film, in many embodiments the seal layer is at least 70%, but may be at least 80%, with each individual seal layer being between about 49.5% and 40%.

Typically, the barrier layer thickness is at least about 1% and less than about 20%, while in one embodiment may be between about 3% and 17%; in other cases the barrier thickness may be about 5%, 10%, or 15% of the thickness of the multilayer film. Some embodiments for use in various types of packaging may benefit from a thicker barrier layer, for example where very low oxygen transfer rates are desired. In another embodiment, the barrier layer is greater than 20%, in some cases up to about 25%, 30%, or more of the multilayer film's total thickness, although other suitable thicknesses can be used in alternative embodiments. In some embodiments, the barrier layer can have a thickness of between about 1% and 7% of the total thickness of the multilayer film. In other cases, the barrier layer may be about 5%, 10%, or 15% of the multilayer film's total thickness. In further embodiments, the barrier layer may be between about 30-1%, 25-5%, or 20-10%, of the multilayer film's total thickness. In most cases, the thickness of the barrier layer is sufficient for the barrier layer to function as a gas barrier. In many embodiments, the thickness of a barrier layer comprising nylon may be more than a barrier layer comprising EVOH, for example between about 3-15% and about 1-10% respectively. In one case, for example where the barrier layer is EVOH, the barrier layer may be about 5% of the multilayer film's total thickness. In another case, for example where the barrier layer is nylon, the barrier layer may be about 10% of the multilayer film's total thickness. In another case, where the barrier layer comprises a core EVOH sublayer positioned between two nylon barrier sublayers, the EVOH sublayer may be about 1-7% of the total thickness of the multilayer film and each nylon sublayer may be about 1-7% of the total thickness of the multilayer film.

In some embodiments, the seal layers can have a thickness of about 80-99% of the total thickness of the multilayer film. While the thicknesses shown with respect to FIG. 2A-D are not to scale, the schematic stack-up of the layers are shown. The thicknesses may also relate to any of the other embodiments in in any combination disclosed herein or not. In some cases, each seal layer may be about 47.5%, 45%, or 42.5% of the multilayer film's total thickness. Where the seal layer comprises two or more sublayers, each sublayer may have the same thickness, for example where each seal layer is 45% of the total thickness of the multilayer film, and the seal layer comprises three sublayers, each sublayer is 15% of the total thickness of the multilayer film.

Extrusion

The films of the present invention may be formed by any number of well-known extrusion or coextrusion techniques, although other processes for producing the multilayer film are envisioned. In some cases, the different layers may be extruded at different temperatures to permit melting and extrusion of the material of each layer, with the composition of the seal layer modified to aid in adhering to the material of the barrier layer. In some embodiments, the barrier layer, and often further inner layers, are extruded at temperatures that are higher than the temperature of the seal layer. In some cases, the adhesiveness of the extruded layer may be altered by altering the extrusion temperature.

Blown film coextrusion processes are used. Blown film extrusion produces a film that can be oriented in both the machine (longitudinal) and transverse (non-longitudinal) direction. In blown film extrusion, the composition can be extruded in a molten state through an annular die and then blown and cooled to form a tubular, blown film. In some cases, the blown film tube can be slit and unfolded to form a flat film, and in others it is further converted in its tubular configuration.

As discussed above and in various embodiments, film plies 27, 29 may be monolayer including only a seal layer which also serves the purposes of a barrier layer. The monolayer may be suitable to contain the air and seal with another film to form the flexible structure for cushioning. The monolayer may be a simple structure as shown in FIG. 4E formed of polyethylene.

Film Conversion and Use

For protective packaging applications, the disclosed films can be converted by heat sealing two plies of the multilayer film or monolayer film to each other. In many cases, the plies are two sheets of a flattened blown film. In many cases, the plies are heat sealed in a predetermined pattern and then can be inflated with a fluid, such as air. In many cases, the inflated films can be sealed by users, for example as disclosed in U.S. Pat. No. 7,862,870, and U.S. patent application Ser. No. 13/844,658. The converted film can be configured for use in a continuous inflation and sealing device, as disclosed in the '658 application or U.S. Pat. Nos. 8,454,779 and 8,061,110, for instance. Devices can be employed that convert, inflate, and seal the plies in-situ, such as disclosed in U.S. Pat. No. 6,789,376. Alternatively, the film can be configured for single inflation operations, and can be provided with check valves between the plies of the multilayer film, for example as disclosed in U.S. Patent Application Publication No. 2004/0163991. In other embodiments, the film can be used in a device for inflating the film with foam precursors and sealing the film for foam-in-bag protective packaging, such as disclosed U.S. Patent Application Publication No 2013/0047552.

As used herein, the film 10 may be comprised of the plies 27, 29 in any combination of layers, materials, and/or manufacturing processes discussed above. For example, film 10 may comprise at least one bi-directionally oriented film ply made up of a barrier layer positioned and connected to two sealing layers according to the disclosure above. In another example, film 10 may comprise a traditional film ply having a single layer with the grain in the longitudinal direction. The film plies may form walls 17, which may be formed of any of the materials, compositions or structures discussed above.

Referring again to FIG. 1, the film plies can include a series of transverse seals 21 disposed along the longitudinal extent of the film plies 27, 29. The seals may be defined by portions of the walls 17 that have been attached to one another through such processes such as heat sealing. The walls 17 may be sealed together or otherwise connected (e.g. fold in the wall) in predetermined areas to define an inflation region 14, (shown as conduit in FIG. 1) which may be flexible and normally in a collapsed state, and inflatable tubular portions 19. For example, transverse seals 21 may define the inflatable tubular portions 19. Each transverse seal area 21 may extend from the longitudinal edge 2, 6 towards the opposite longitudinal edges 4, 8. Each transverse seal area 21 may include a pair of seals separated by an unsealed portion of the walls. In various examples, the longitudinal seal 23 may define the inflation conduit 14. The opposite side of the inflation conduit 14 may be defined by a longitudinal seal 30 applied to longitudinal edges 4, 8 and or a seal applied adjacent thereto. In accordance with various embodiments, the transverse seals 21 may terminate at the longitudinal seals 23. As such the transverse length of each of the tubular portions 19 may extend from the longitudinal seal 23 to a longitudinal seal 32 applied to longitudinal edges 2, 6 and or a seal applied adjacent thereto.

Each transverse seal area 21 may have a first end 22 proximate the second longitudinal edge 2, 6 and a second end 24 proximate the longitudinal seal 23. The chamber 19 may be defined within a boundary formed by the longitudinal seal 23 and pairs (e.g. seals 21a and 21b shown in FIGS. 7A and 7B) of adjacent transverse seals 21. The width of each tubular portion 19 may be at least about ½ inches to about 3 inches, or, in another example, about 1 inches to about 2 inches.

Each transverse seal area 21 may be substantially straight and extend substantially perpendicular to the longitudinal edges 2, 6. It is appreciated, however, that other arrangements of the transverse seals 21 are also possible. For example, in some embodiments, the transverse seals 21 may have undulating or zigzag patterns. The transverse seals 21 as well as the longitudinal seals 23, 30, and or 32, can be formed from any of a variety of techniques known to those of ordinary skill in the art. Such techniques include, but are not limited to, adhesion, friction, welding, fusion, heat sealing, laser sealing, and ultrasonic welding.

As discussed above, the inflatable cushion 18 may include an inflation region, such as a closed passageway, which can be a longitudinal inflation conduit 14. The longitudinal inflation conduit 14, as shown in FIG. 1, is disposed between the second end 24 of the transverse seals 21 and the longitudinal edge 4,8 or the longitudinal seal 30. The longitudinal inflation conduit 14 extends longitudinally along the longitudinal length of the cushion 18 proximate edges 4, 8. In various embodiments, the inflation region may be open to the outside of the cushion and merely utilize a nozzle operable to inflate a cushion with an open inflation region. Such region may merely have two flaps connected by the longitudinal and transverse seals.

The cushion 18 also includes an inflation opening or aperture 16. The inflation opening 16 is disposed on at least one end of the longitudinal inflation conduit 14. The aperture 16 is defined by the walls 17 (e.g. outer walls 5, 7) and is configured and dimensioned for receiving an inflation nozzle 20 therein. The inflation nozzle may be any nozzle such as, for example, the one discussed in U.S. Pat. No. 8,424,552. The inflation nozzle 20 is sized to have a friction fit with the aperture 16. In one embodiment, the inflation nozzle 20 has an interference fit with the aperture 16.

Located partially within the aperture 16 and inflation conduit 14, and extending partially into each of the tubular portions 19, is another set of sheets 12. Sheet 12 may also be sealed along transverse and longitudinal seals 21 and 23, except at valve areas 15. As shown in FIG. 7B, the seal 23*a* may be a seal that extends through the whole cushion. For example, this may be plies 27, 29 sealed together or plies 27, 29 and any intermediate sheets 12 may be sealed together. Seal 23*b* is a seal between an intermediate sheet 12 and the adjacent ply (e.g. 27 or 29). Seal 23*b* does not extend between adjacent sheets 12. Thus air can flow between adjacent sheets 12 at the vicinity of seal 23*b*. These valve areas 15 may define one-way check valves 13 between the areas 15, configured to let air into the tubular portions 19 from inflation conduit 14 and seal the air therein. The unsealed areas between sheets 12 that define the check-valves 13 may be kept unsealed during the sealing operation that seals inner sheets 12 to outer sheets 17 (e.g. by printing on the areas to remain unsealed.

Each of the one-way check valves 13 fluidly connects the inflation conduit 14 to a respective tubular portion 19. In the uninflated state, for example during shipping of the cushions 18, the aperture 16 is closed and flat, and the check valves 13 are in a closed position. Upon opening of the aperture 16 by the inflation nozzle 20, air can be delivered into the inflation conduit 14. The operating pressure at which the air is delivered into the inflation conduit 14 opens the check valves 13 to allow air to pass into the tubular portions 19 to inflate the remaining portions of the cushion 18. Once inflation of the cushion 18 is complete, the pressure of the air within each tubular portion 19 acts against the check valves 13 to keep the valves in the closed position, thus preventing air from escaping and the cushion from deflating.

In one embodiment, the inflatable cushion 18 further includes seal segments 28. The seal segments divide the inflatable chambers 19 in transverse chamber portions 19*a*. The seal segments 28 may be aligned longitudinally and separated by transverse seals 21. The seal segments 28 create bendable lines that allow for a more flexible film ply that can be easily bent or folded. Such flexibility allows for the film ply to wrap around regular and irregularly shaped objects. The chamber portions 19*a* are in fluid communication with adjacent chamber portions 19*a* as well as with the inflation region 14. In various embodiments, the inflation region may be a channel 14 closed to the exterior of the inflatable cushion but open to the chambers. As shown, passages 19*b* extend between chamber portions 19*a* on either side of the seal segments 28.

In accordance with various embodiments, a series of lines of weaknesses 26 may be disposed along the longitudinal extent of the film plies 27, 29. The transverse lines of weakness 26 facilitate separation of adjacent inflatable chambers 19. Adding a perforation across the film plies 27, 29 of the pad enables the sheet to be separated into subsequent pads or sheets while only having to perform the inflation process once. The separated sheet lengths may typically range from several inches (e.g. one row of inflated chambers) to several feet (a plurality of rows of inflated chambers 19). The film plies 27, 29 could also be continuous to the extent that materials are available. The film plies 27, 29 may be perforated prior to being formed and sealed into an uninflated cushion 18 or alternatively an uninflated cushion 18 may be perforated prior to being inflated.

Figure 3:
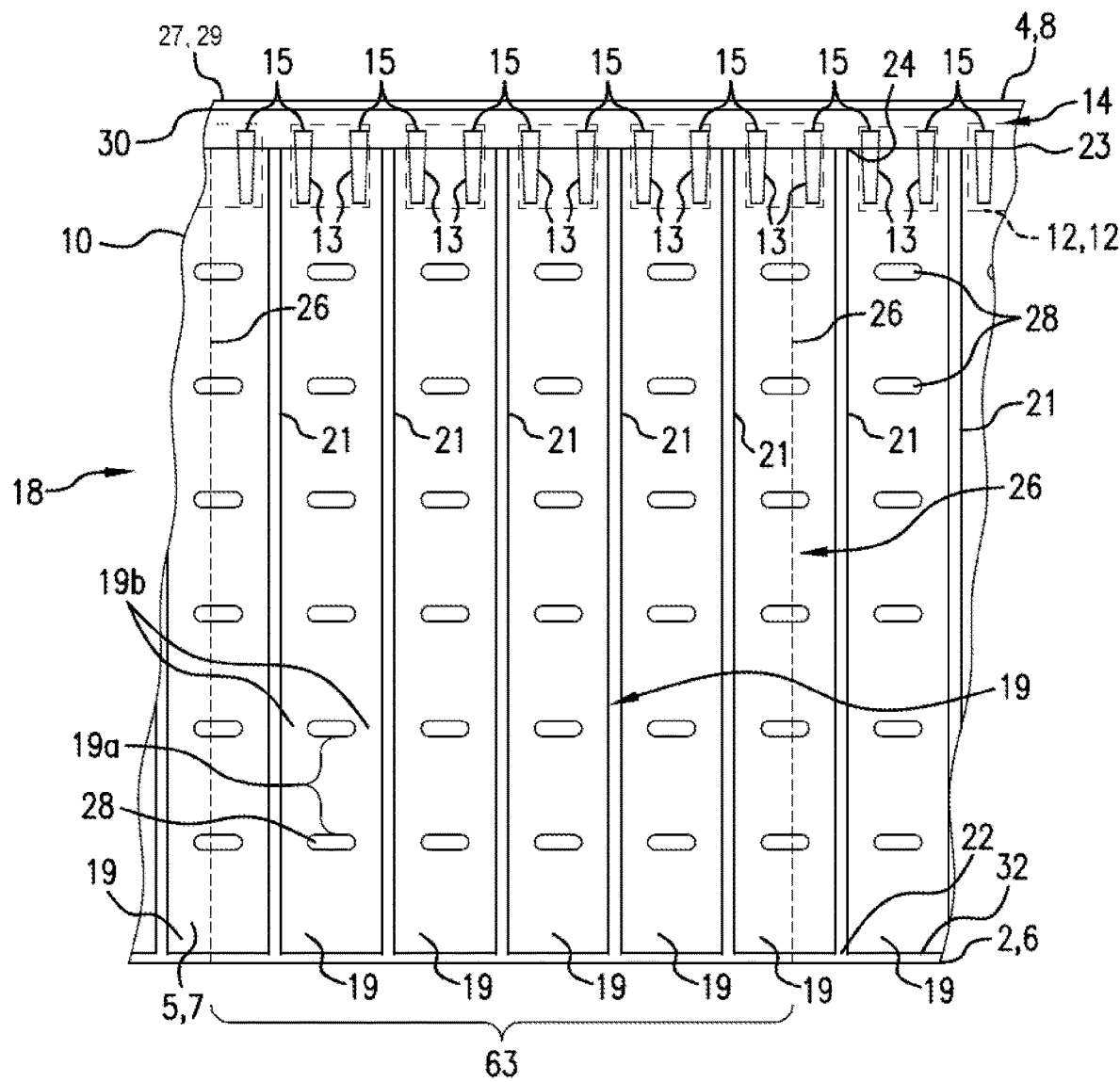
FIG. 3 is a schematic depiction of a flexible structure with transverse perforations in accordance with various embodiments.
Figure 4:
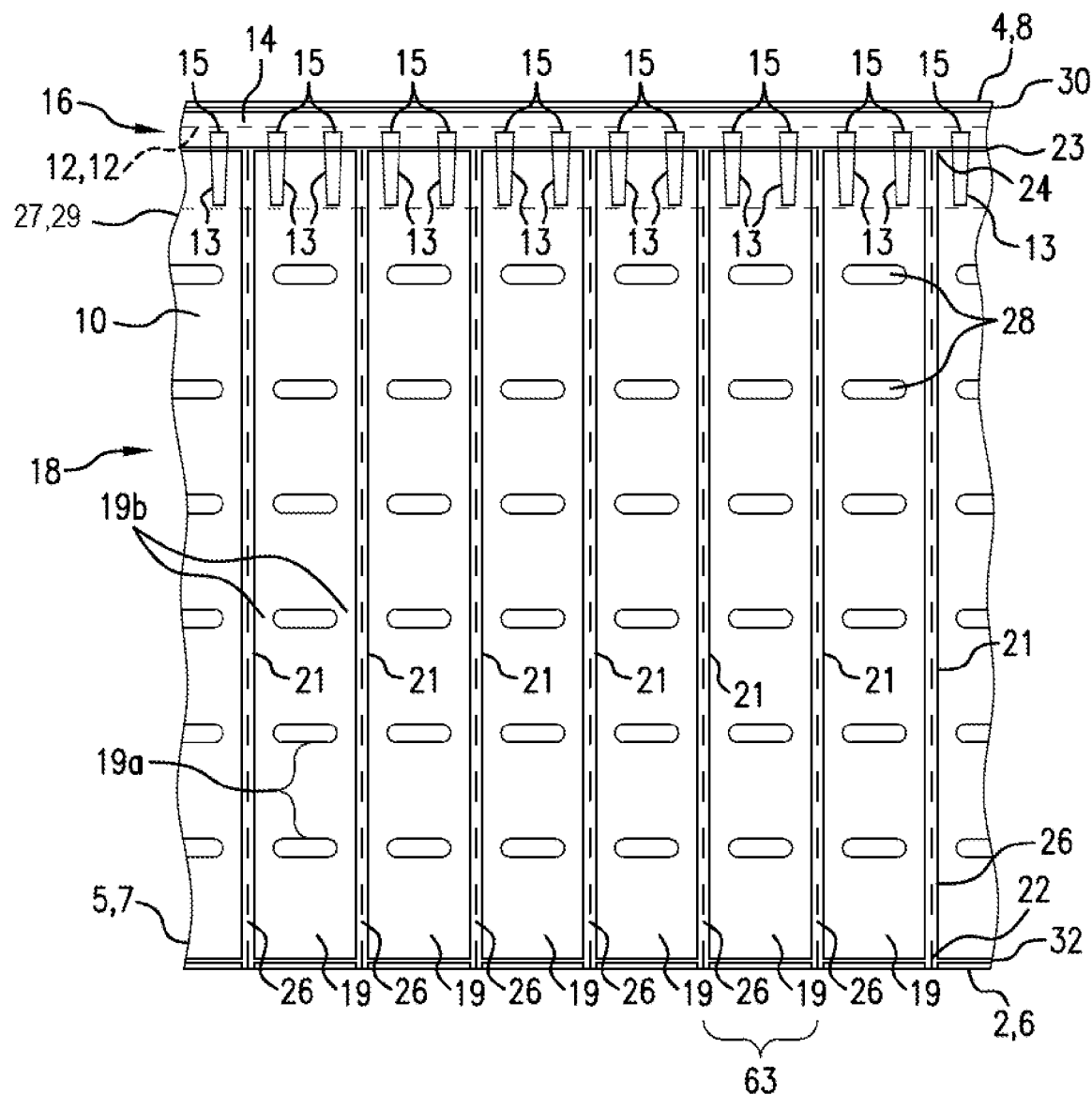
FIG. 4 is a schematic depiction of a flexible structure with transverse perforations in accordance with various embodiments.
Figure 5:
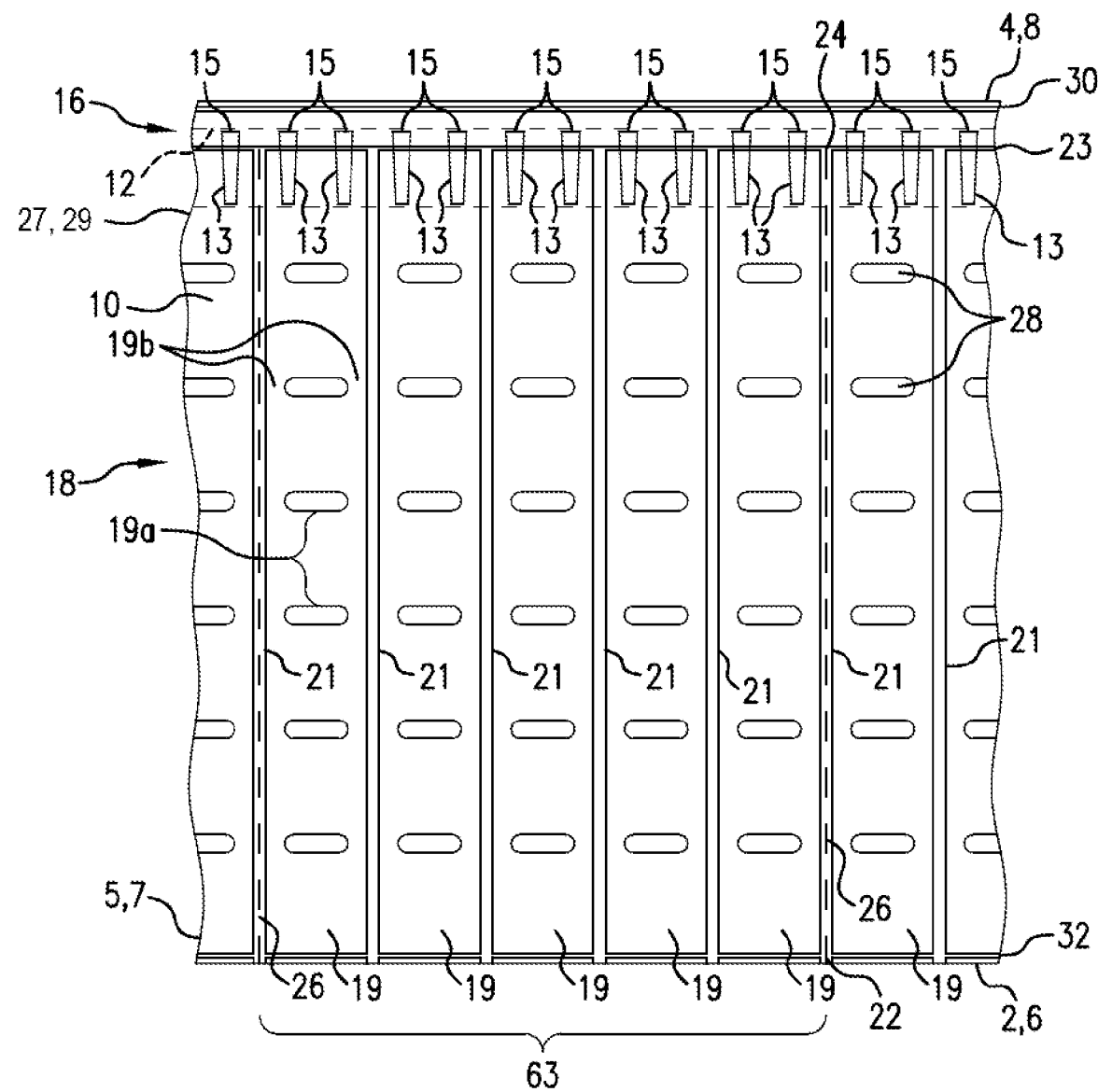
FIG. 5 is a schematic depiction of a flexible structure with transverse perforations in accordance with various embodiments.
Figure 6:
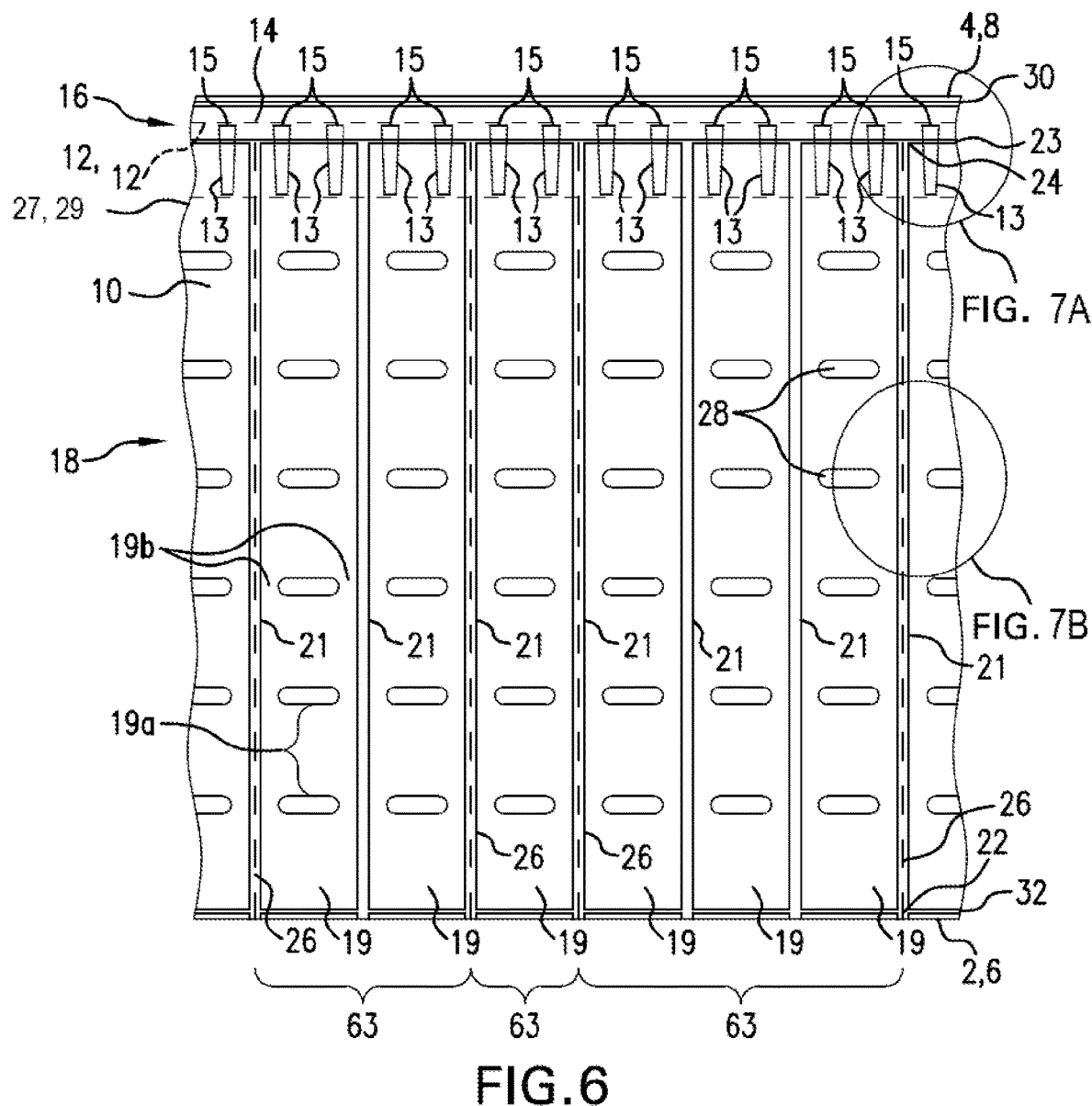
FIG. 6 is a schematic depiction of a flexible structure with transverse perforations in accordance with various embodiments.

The lines of weakness may extend transversely across the inflatable cushion 18. Each transverse line of weakness 26 may extend from the longitudinal edge 2, 6 towards the longitudinal edge 4, 8. Each transverse line of weakness 26 may be located at any point longitudinally along the cushion 18. The perforations allowing for sheet separation may be placed randomly or strategically between the transverse seals 21 that form rows of inflated chambers 19. Lines of perforation could also be placed at a repeatable frequency or multiple frequencies across the length of the sheet allowing for different size pads to be utilized for a desired application. In one example, as shown in FIG. 3, the transverse lines of weakness 26 may pass through a chamber 19. This location for the lines of weakness may result in pressure loss in that chamber and potentially in other chambers during inflation. As shown in FIG. 4, each line of weakness 26 may be disposed through each transverse seal area 21, or in an uninflated region or region between the inflated chambers, between immediately adjacent pairs of transverse seals 21. For example, the lines of weakness 26 may be disposed between each of the adjacent transverse seals 21*a* and 21*b* that make up each transverse seal area 21 (see FIGS. 7A and 7B for detailed views). Alternatively, the transverse seal area may be a solid seal that extends between the edges marked by 21*a* and 21*b* with the lines of weakness 26 formed within the solid seal. In this way, each chamber 19 may be separated by the user from the other chambers 19. As shown in FIG. 5, the lines of weakness 26 may be disposed through every couple of transverse seals 21, or through the uninflated region or region between every couple of the inflated chambers, between immediately adjacent pairs of transverse seals 21. These groups of chambers 19 separated by transverse seals 21 may form cushions 63. Changing the size of cushions allows for flexibility when protecting items with the inflated films. In this way, the chambers 19 may be separated into transverse seal area 21 cushions 63. This may be done at regular frequencies, such as every other transverse seal area 21, every third transverse seal area 21, every fourth transverse seal 21, every fifth transverse seal 21 (as shown in FIG. 5), or at any other regular frequency. Additionally or in the alternative, the chamber 19 may be separated as groups of the chambers at irregular frequencies. For example, as shown in FIG. 6, the first line of weakness may occur on each side of a chamber 19 through the adjacent transverse seals 21, the next line of weakness may occur with two chambers 19 between, the third line of weakness may occur with four chambers 19 between and so on.

In accordance with various embodiments, the transverse lines of weakness 26 may extend across a portion of the transverse direction of film plies 27, 29. In one example, the lines of weakness may extend from longitudinal edge 2, 6 to or near the longitudinal seal 24. In another example, the lines of weakness 26 may extend approximately the length of the transverse seal area 21. In another example, the lines of weakness 26 may extend less than the length of the transverse seal area 21. In another example, the lines of weakness may extend across the entire transverse direction of film plies 27, 29 except for the region occupied by the inflation conduit 14. In another example, the first end 22 of the transverse seal 21 may be proximate to one end of the line of weakness 26. The second end 24 of the transverse seal area 21 may be proximate another end of the line of weakness 26. The transverse lines of weakness 26 may terminate at or proximal to the longitudinal seal 24, extending only on the transverse side of the longitudinal seal 24 on which the inflatable chambers 19 are located, opposite from the inflation conduit 14. In various embodiments the transverse lines of weakness 26 do not extend across the longitudinal seal 24 into the inflation conduit 14. In this way, the inflation conduit 14 can maintain a higher pressure for inflating the chambers 19 during the fill process. In other inflatable cushions in which the lines of perforations do cross into the inflation conduit 14, some amount air or other filling fluid can escape from the inflation conduit through the perforations. Having an unperforated inflation conduit helps preserve the pressure, allowing lower pressure of flow inflation systems to be used with the product. When used in continuous inflation and sealing devices, the unperforated inflation region 14 can help prevent an inflation nozzle 20 received in the region 14 from catching on the material or in a perforation and causing the film to tear as it is pulled over the nozzle 20. As such, in accordance with various embodiments, the transverse lines of weakness 26 may not extend across into the inflation conduit 14.

A strip of material may be defined by a portion of the plies 27, 29 not crossed by the one or more lines of weakness 26. The strip of material may connects the portions of the plies 27, 29 that are separated by torn lines of weakness 26. The strip of material may be the inflation region 14. The strip of material may be larger or smaller in the traverse direction than the inflation region 14. For example, the strip of material may be a longitudinal seal proximal edge 5 or the strip of material may be half the transverse width of the cushion. The lines of weakness 26 may be more easily torn than the strip of material. When torn at the lines of weakness, the chambers 19 may form fingers being connected to one another at the strip of material. As shown in FIG. 6 a different number of chambers may be present between each longitudinally successive line of weakness 26. As such, a first finger and a second finger may have different longitudinal widths as there may be different widths between lines of weakness. The lines of weakness may extend all the way to one edge of the first film ply but not all the way to the edge of the the opposite edge of the first film ply.

The transverse lines of weakness 26 as discussed herein may be applied to any of a variety of films. In one example, the film may be configured similar to those discussed above and shown in FIGS. 1A, 3-7. In such, embodiments the chambers are filled by pressurizing the inflation conduit and forcing air through the one way valves 13. By having an inflation conduit 14 without perforations, the pressure to fill the chambers 19 through the one way valves 13 is reduced.

Figure 1B:
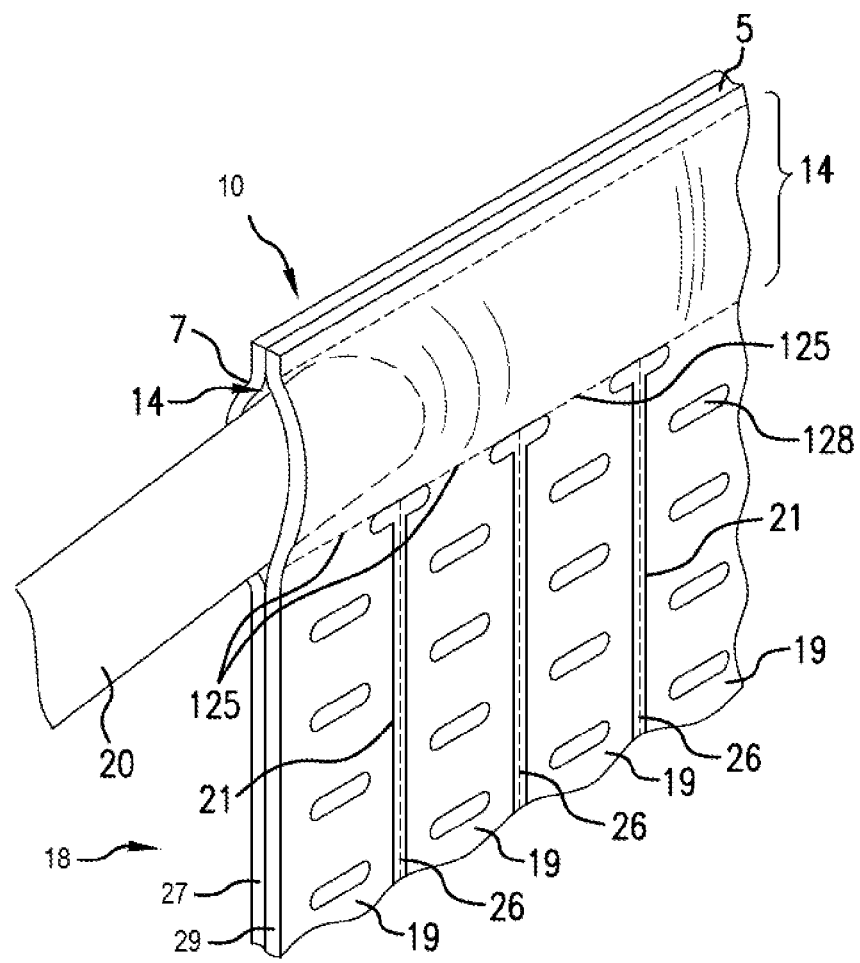
FIG. 1B is a perspective schematic of a flexible structure having a continuous flow channel and nozzle with transverse perforations in accordance with various embodiments.

In another example, the transverse lines of weakness 26 as discussed herein may be applied to film plies 27, 29 which may be configured with a continuous inflation region 14 as illustrated in FIG. 1B. With a continuous inflation region 14, the uninflated cushion is continually advanced over the nozzle 20 during inflation with the nozzle directing air laterally into the chambers 19 through openings 125. The chambers 19 are then sealed from the inflation conduit 14 proximal to the openings 125. In embodiments, wherein the inflation region is closed (e.g. a conduit or channel), the inflation region 14 is also cut open so the nozzle 20 can be removed from the inflation conduit 14 and the film may be continuously fed through the system. By having an inflation conduit 13 without perforations, the pressure to fill the chambers 19 is reduced. The nozzle 20 may also or alternatively advance through the inflation conduit easier as it does not contact irregularities in the surface where the perforations have passed through the inflation region. As the feed of the film plies 27, 29 across the nozzle may occur at high speeds, the interference between the nozzle and the perforations may be reduced or eliminated thereby improving the flow of uninflated cushion onto and down the nozzle.

In other examples, the transverse lines of weakness 26 as discussed herein may be applied to any film with any orientation of inflation conduit and chambers. For example, some films may have a central inflation conduit with chambers extending from either or both sides. Similarly, the perforations may extend between inflation chambers on either side of the inflation conduit without crossing into or otherwise perforating the conduit.

Figure 7A:
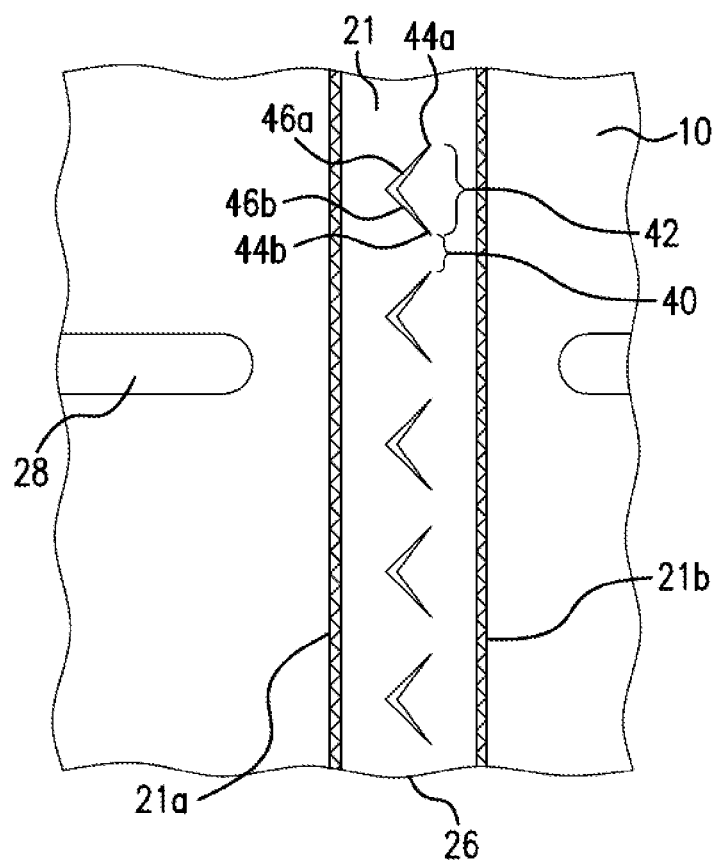
FIG. 7A is a detailed view of the longitudinal and transverse seal and perforation of FIG. 6.
Figure 7B:
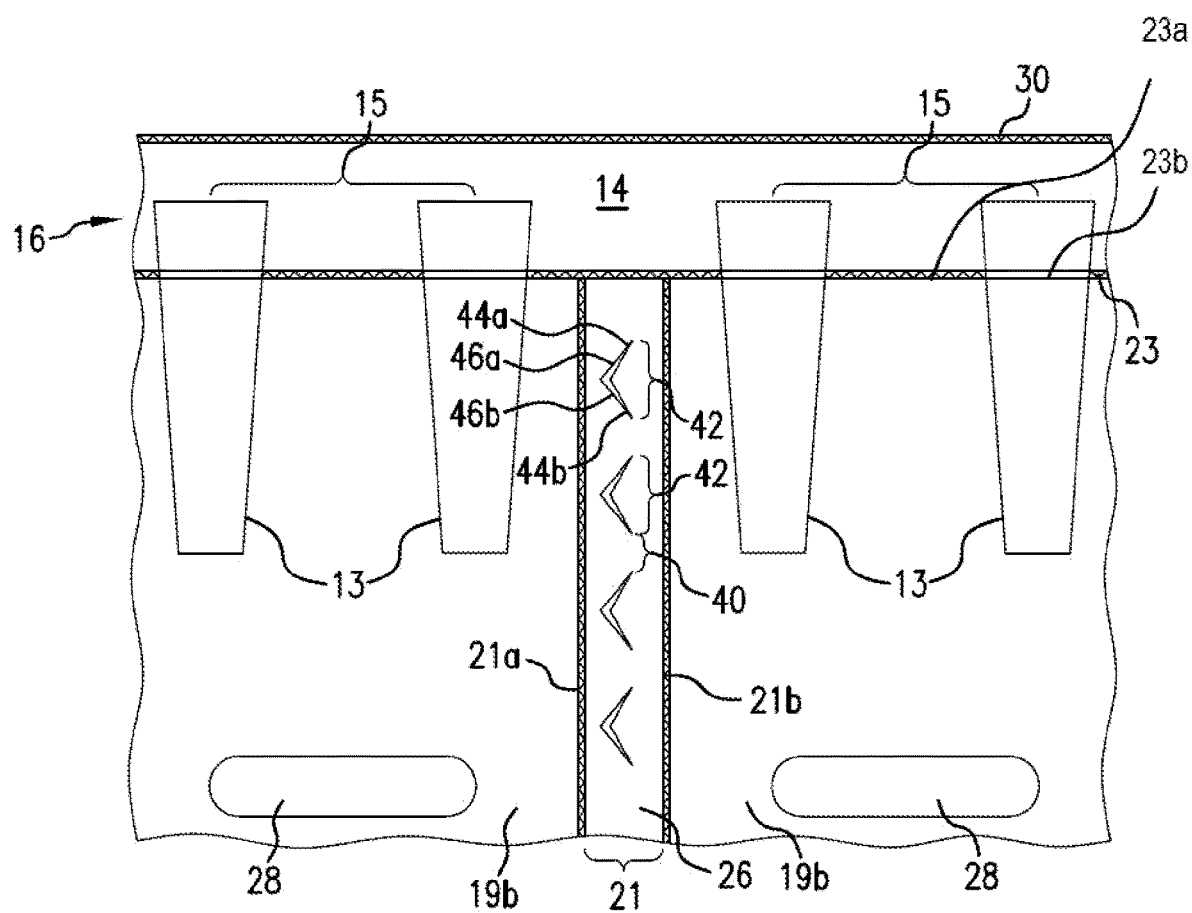
FIG. 7B is a detailed view of the valve, seal and perforation of FIG. 6.
Figure 7C:
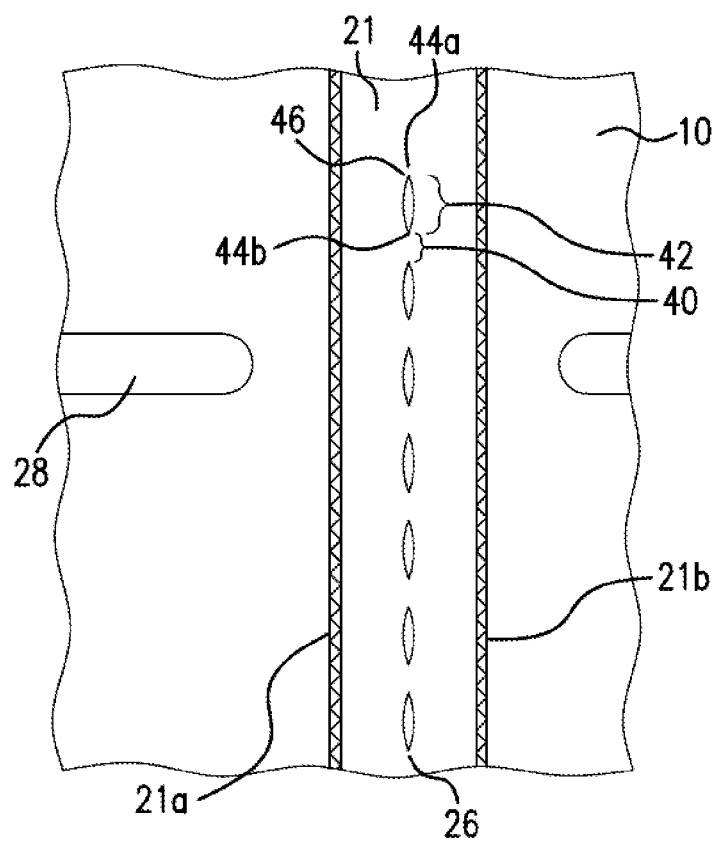
FIG. 7C is an alternative embodiment to FIG. 7A having perforations in the form of traverse slits.

In accordance with various embodiments, the transverse lines of weakness 26 can be formed by perforating film plies 27, 29 to form alternating lands 40 and slits 42 as shown in FIGS. 7A and 5B. The slits may be any shape known by those of ordinary skill in the art. In one example, the slits may be straight lines extending transversely across film plies 27, 29 as shown in FIG. 7C. The perforations may also extend longitudinally (e.g. longitudinal slits) while the direction of the line of weakness 26 may still extend transversely. In this way the perforation may have a component that is not merely transverse (e.g. a longitudinal component). For example, the perforations may have portions that extend in a direction that has a longitudinal and transverse component, e.g. a straight slit may extend at an angle being neither purely transverse or longitudinal (e.g. the direction of an individual slit may not be collinear with either a longitudinal seal or a transverse seal) In various embodiments, the shape of slit applied may include short slits that have a first and second end 44a, 44b that are not collinear with the direction that the line of weakness 26 generally extends. For example, the perforation may have a first end and a second end that are not in a straight line and may point in directions other than transversely across the film plies 27, 29. The ends may both point in the same direction such as the machine direction. For example, the perforation may be curved with the first and second end pointing in the machine direction. In accordance with various examples, the perforation may have intersecting portions with each portion having a transverse and longitudinal component. This may be a chevron shaped slit 42 as shown in FIGS. 7A and 7B. As shown, each slit includes two intersecting portions 46a, 46b with ends 44a, 44b. Each slit 42 is spaced adjacent to another slit 42 and separated by a land 40 of material. The adjacent slits 42 continue across the film plies 27, 29 in the direction of the lines of weakness 26. If used on traditional inflatable cushions, perforations that extend in directions other than transversely would have a tendency to tear out of the transverse seals 21 and into the inflation chambers because the grain of the material extend in the longitudinal direction making tears in that direction easier. However, when used with a material having bi-directional orientation, as discussed above, the material properties provide the surprising benefit of helping the perforations that extend in directions other than transversely to tear between or within a transverse seal and limit the frequencies of tears that extend into the inflation chambers 19. Utilizing the material having bi-directional orientation with the chevron shaped perforations may make it easier to tear in the direction of lines of weakness but reduce tearing in undesirable directions, e.g. into the chamber 19. But it may be noted that typical film structures having the grain in any orientation including longitudinally may also be utilized herein.

In accordance with various embodiments, the transverse lines of weakness 26 can also or alternatively include any of a variety of lines of weakness known by those of ordinary skill in the art. For example, in some embodiments, the transverse lines of weakness 26 include rows of perforations, in which a row of perforations includes alternating lands and slits spaced along the transverse extent of the row. The lands and slits can occur at regular or irregular intervals along the transverse extent of the row. Alternatively, for example, in some embodiments, the transverse lines of weakness 26 include score lines or the like formed in the film material.

Figure 8:
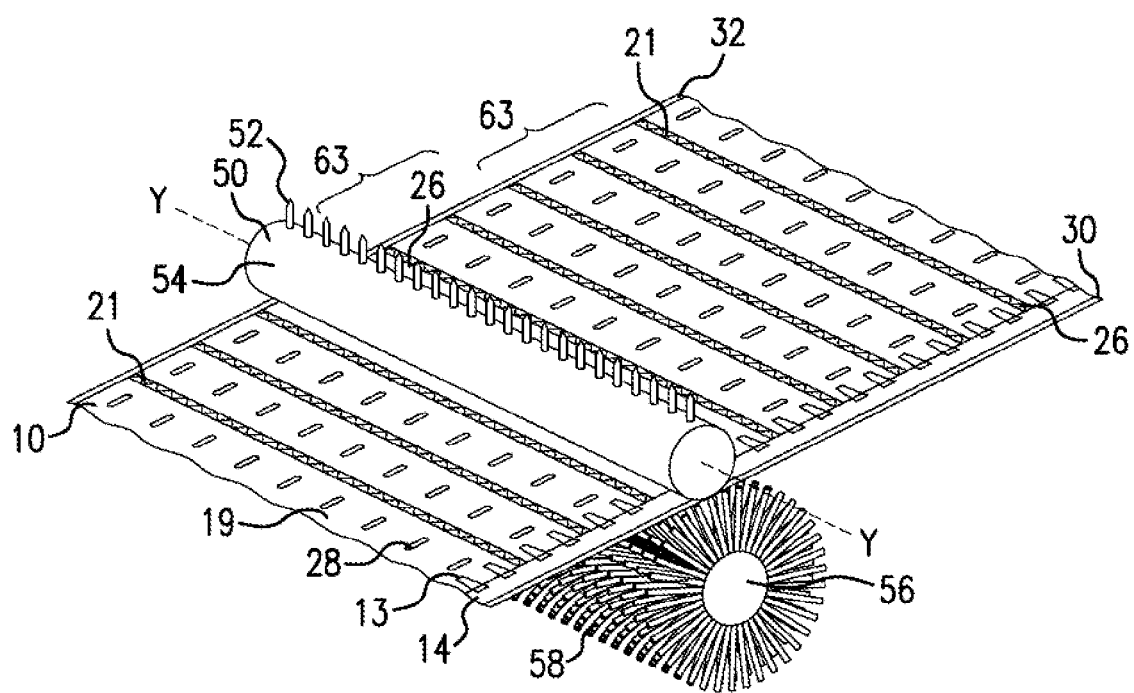
FIG. 8 is a schematic illustration of a flexible structure being perforated by a chevron shaped perforation wheel in accordance with various embodiments.

The transverse lines of weakness 26 can be formed from a variety of techniques known to those of ordinary skill in the art. In one example, as shown in FIG. 8 a roller 50 having a plurality of knives 52 spaced across the surface 54 in the direction of axis Y may compress the film plies 27, 29 between the roller 50 and a support 56. The support 56 may include a plurality of bristles 58 for supporting the film plies 27, 29. The bristles 58 may extend from a tubular roller 56 that rolls along with the roller 50 or the bristles may extend from a flat surface or bristles. In this manner the knives 52 may perforate film plies 27, 29 at any of the intervals and locations discussed herein or otherwise known by those of ordinary skill in the art. The knives 52 may have tips that form chevron shapes as discussed in various embodiments herein but may also be other perforation shapes. Other such techniques for forming the perforations may also include, but are not limited to, cutting (e.g., techniques that use a cutting or toothed element, such as a bar, blade, block, wheel, or the like) and/or scoring (e.g., techniques that reduce the strength or thickness of material in the first and second film layers, such as electromagnetic (e.g., laser) scoring and mechanical scoring).

The term "about," as used herein, should generally be understood to refer to both the corresponding number and a range of numbers. Moreover, all numerical ranges herein should be understood to include each whole integer within the range. While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. An inflatable cushion, comprising:
   a first film ply extensive in a longitudinal direction and a lateral direction;
   a second film ply extensive in the longitudinal direction and the lateral direction and overlaid on and sealed to the first film ply such that the plies define therebetween:
   an inflation region extending longitudinally between the plies and being operable to receive a nozzle, and
   a plurality of chambers extending transversely from the inflation region, wherein each of the plurality of chambers has an opening to the inflation region which contains no valves therewithin and which has a configuration which allows fluid flow from the inflation region to its respective chamber in the plurality of chambers to enable filling of the chambers with fluid injected into the inflation region from the nozzle, and from the plurality of chambers to the inflation region;
   wherein the overlapping plies include a plurality of lines of alternating lands and slits that extend transversely across the plies substantially excluding the inflation region by terminating approximately the same location as transverse seals proximate to the inflation region, with the transverse seals defining the longitudinal sides of the plurality of chambers, the lines of alternating lands and slits being configured to facilitate tearing through the plies to separate portions of the inflatable cushion.

2. The inflatable cushion of claim 1, wherein the inflation region includes a strip of material that is a portion of the plies not crossed by the plurality of lines of alternating lands and slits, wherein the strip of material connects the portions of the plies that are separated by torn lines of alternating lands and slits.

3. The inflatable cushion of claim 2, wherein the lines of alternating lands and slits are more easily torn than the strip of material and the lines of alternating lands and slits separate the chambers and when torn at the lines of alternating lands and slits, chambers form fingers being connected to one another at the strip of material.

4. The inflatable cushion of claim 3, wherein a first finger and a second finger have different longitudinal widths.

5. The inflatable cushion of claim 2, wherein the lines of alternating lands and slits extend all the way to one edge of the first film.

6. The inflatable cushion of claim 1, wherein the inflation region comprises unattached edges of the first and second film plies proximal to a first longitudinal edge with a longitudinal connected portion positioned parallel and adjacent thereto.

7. The inflatable cushion of claim 1, wherein the first and second film plies include a first longitudinal connected portion positioned proximal to a first longitudinal edge with a second longitudinal connected portion positioned parallel and adjacent thereto, with the first longitudinal seal and the second longitudinal seal defining the inflation region.

8. The inflatable cushion of claim 7, wherein the inflation region is a longitudinal conduit.

9. The inflatable cushion of claim 1, wherein the plurality of alternating lands and slits are defined by perforations formed from slits that have portions that extend in a direction that has both a longitudinal and a transverse component and the slits extend through one of at least the first film ply or the second film ply with each end of the slits proximate to an end of an adjacent slit thereby forming a line of slits transversely across the first film ply and the second film ply.

10. The inflatable cushion of claim 9, wherein the slit is a straight slit.

11. The inflatable cushion of claim 9, wherein the slit is a chevron shaped slit.

12. The inflatable cushion of claim 1, wherein the plurality of lines of alternating lands and slits are defined by perforations formed from transverse straight slits.

13. An inflatable cushion, comprising:
    a first film ply extensive in a longitudinal direction and a lateral direction;
    a second film ply extensive in the longitudinal direction and the lateral direction and overlaid on and sealed to the first film ply such that the plies define therebetween:
    a continuous inflation region extending longitudinally, and a plurality of chambers extending transversely in fluid communication with the inflation region, wherein each chamber in the plurality of chambers includes an opening to the inflation region which has a configuration to allow fluid flow from the inflation region to each of the plurality of chambers to enable filling of the chambers with fluid injected into the inflation region, while not preventing fluid flow from the plurality of chambers to the inflation region; and overlapping lines of weakness extend transversely across each of the plies and less than completely across the plies forming a longitudinal strip of connected material substantially excluding the inflation region by terminating approximately as the same location as the plurality of chambers proximate to the inflation region, the lines of weakness being more easily torn than the longitudinal strip of connected material facilitating tearing through the plies to separate portions of the inflatable cushion.

14. The inflatable cushion of claim 13, wherein the lines of weakness extend all the way to one edge of the first film ply but not the opposite edge of the first film ply.

15. The inflatable cushion of claim 14, wherein the lines of weakness separate the chambers and when torn at the lines of weakness, chambers form fingers being connected to one another at the longitudinal strip of connected material.

16. The inflatable cushion of claim 13, wherein the inflation region is free of lines of weakness forming at least a portion of the longitudinal strip of connected material.

17. The inflatable cushion of claim 1, wherein the first ply includes one or more layers of material extruded together into a single ply of material.

18. The inflatable cushion of claim 1, wherein the lines of alternating lands and slits extend approximately the same length as the transverse seal.

19. The inflatable cushion of claim 13, wherein the lines of weakness terminate at approximately the same location as transverse seals defining the plurality of chambers proximate to the inflation region.

20. The inflatable cushion of claim 19, wherein the lines of weakness extend approximately the same length as the transverse seal.

21. The inflatable cushion of claim 1, wherein the one or more lines of alternating lands and slits extend an entire transverse length of the plurality of chambers.

22. The inflatable cushion of claim 1, wherein the one or more lines of alternating lands and slits terminate at the inflation region.

23. The inflatable cushion of claim 13, wherein the opening contains no valves therewithin.

* * * * *